March 23, 1954

C. MARTIN 2,673,094

FIFTH WHEEL CONNECTION FOR TRACTORS AND TRAILERS

Filed June 9, 1950

INVENTOR.
CHARLES MARTIN
BY
Church & Church
HIS ATTORNEYS

March 23, 1954
C. MARTIN
2,673,094
FIFTH WHEEL CONNECTION FOR TRACTORS AND TRAILERS
Filed June 9, 1950
2 Sheets-Sheet 2
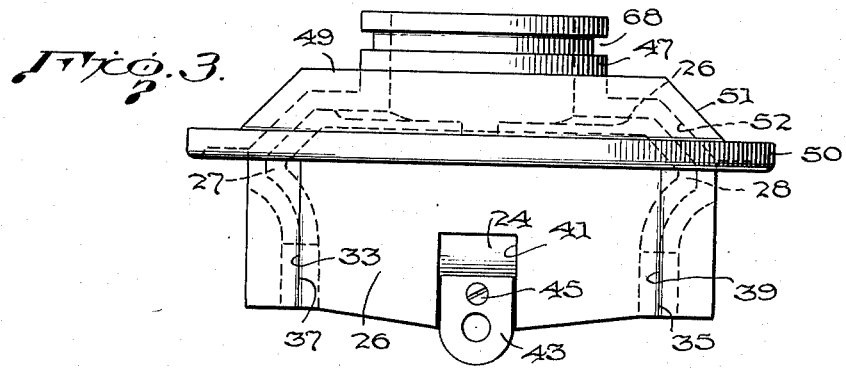
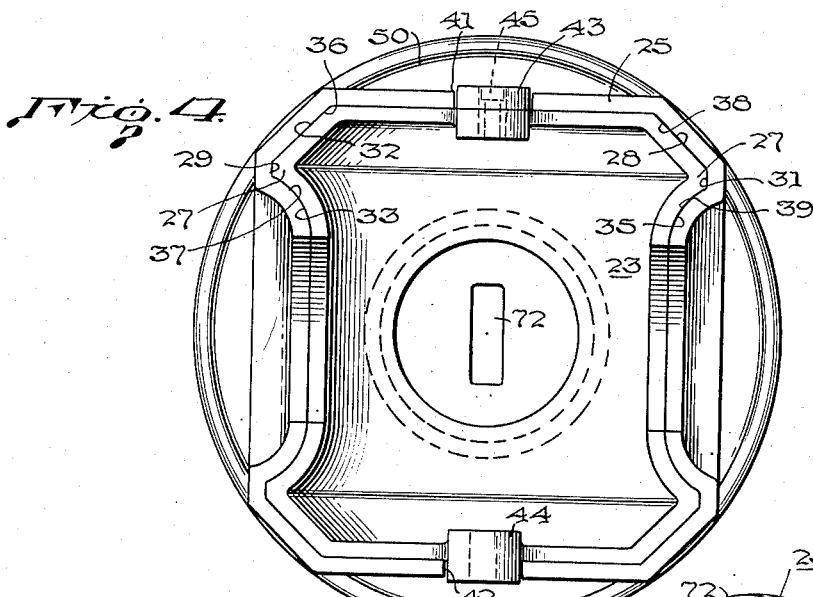
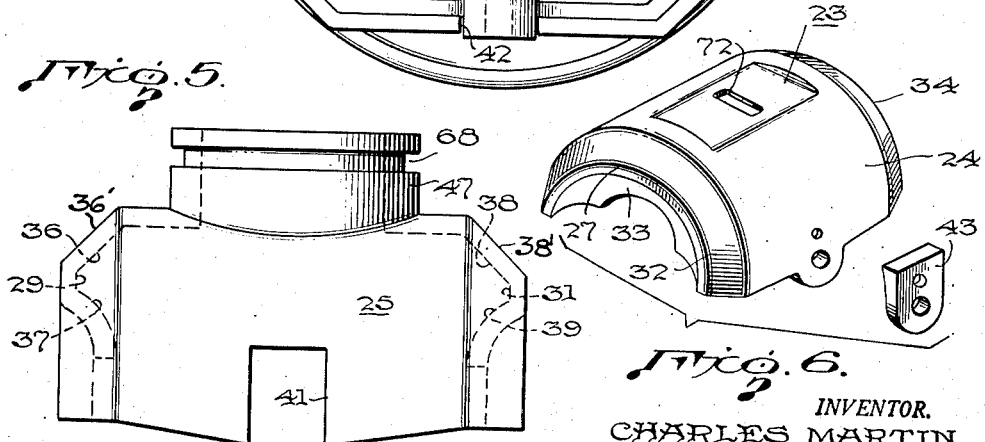
INVENTOR.
CHARLES MARTIN
BY
Church & Church
HIS ATTORNEYS Patented Mar. 23, 1954

2,673,094

UNITED STATES PATENT OFFICE 2,673,094

FIFTH WHEEL CONNECTION FOR TRACTORS AND TRAILERS

Charles Martin, Crystal River, Fla.

Application June 9, 1950, Serial No. 167,154

13 Claims. (Cl. 280—438)

This invention relates to a fifth wheel connection for tractors and trailers and particularly concerns connections of the type having a rider plate with a saddle plate slidable thereon in an arcuate transverse path.

Examples of this type of fifth wheel connection are found in Bradshaw Patent No. 2,053,812, granted September 8, 1936, and Bradshaw Patent No. 2,129,989, granted September 13, 1938. The present invention is an improvement upon the fifth wheel connections shown in these patents.

A major object of the invention is to provide a fifth wheel connection in which the rider plate and saddle plate are interlocked in a manner permitting movement solely in an arcuate path about a longitudinal axis. More particularly, an object of the invention is to provide a fifth wheel connection in which the rider plate and saddle plate may be economically manufactured and readily assembled into interlocked relation. A further object of the invention is to provide a fifth wheel connection having increased contact area for the contiguous surfaces on the rider plate and the saddle plate without enlarging the plates themselves. Also, an object of the invention is to provide a fifth wheel connection in which longitudinal thrust forces are transmitted directly between the rider plate and the saddle plate and in which the two plates are interlocked against relative movement in a vertical direction.

Another object of the invention is to provide a fifth wheel connection of the type described with increased bearing surface between the turntable and a trailer plate resting thereon. Especially, an object of the invention is to provide a fifth wheel connection in which the turntable and the trailer plate thereon transmit thrust in horizontal directions. Heretofore, horizontal thrusts were transmitted through a raised neck on the saddle plate, but in accordance with this invention, horizontal thrusts in a longitudinal direction are transmitted from the turntable directly to the saddle plate.

In the attainment of these objects one important feature of the invention resides in the arrangement of complementary projections and recesses on the ends of the rider and saddle plates interlocking the plates and permitting relative sliding movement thereof solely in an arcuate path. Another feature of the invention resides in the arrangement of these complementary projections and recesses with complementary concave and convex portions. In accordance with a further feature of the invention stops on one plate project through elongated openings on another plate to permit relative sliding movements of the plates in the aforesaid arcuate path. Another important feature of the invention resides in the arrangement of a turntable having a frusto-conical shape with a correspondingly shaped trailer plate resting thereon.

These, and other objects and features of the invention will become apparent with the following specification taken in connection with the accompanying drawings wherein Figure 1 is a fragmentary vertical transverse sectional view through a tractor and trailer assembly illustrating a fifth wheel construction embodying the invention in its preferred form;

Fig. 3 is a side elevational view of a fifth wheel connection as illustrated in Fig. 1 with the trailer plate removed;

Fig. 4 is a bottom view of the fifth wheel connection shown in Fig. 3;

Fig. 5 is a side elevational view of the saddle plate; and

Fig. 6 is an exploded perspective view of the rider plate showing one of the stops removed to permit assembly with the saddle plate.

Figure 1:
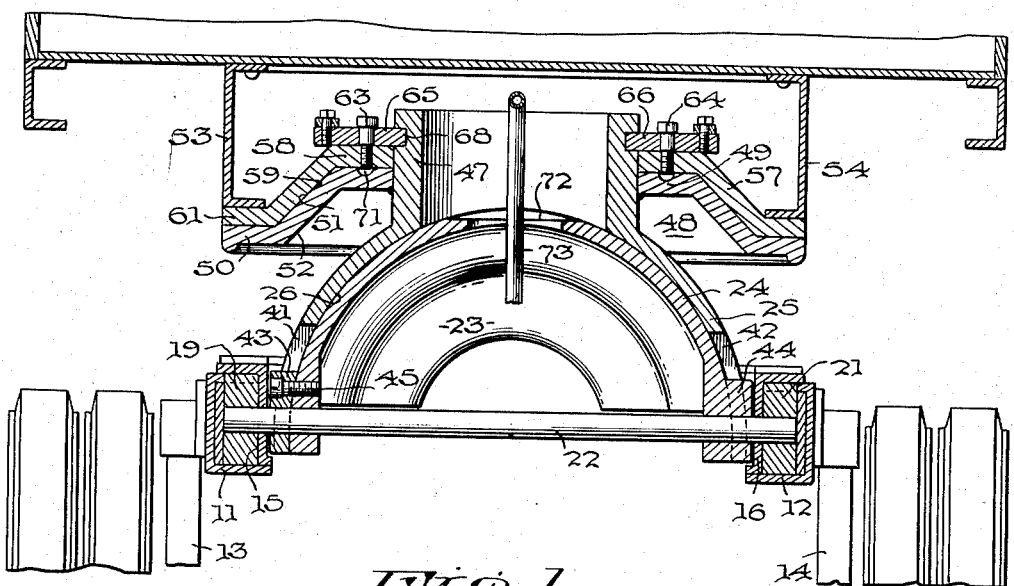
Figure 2:
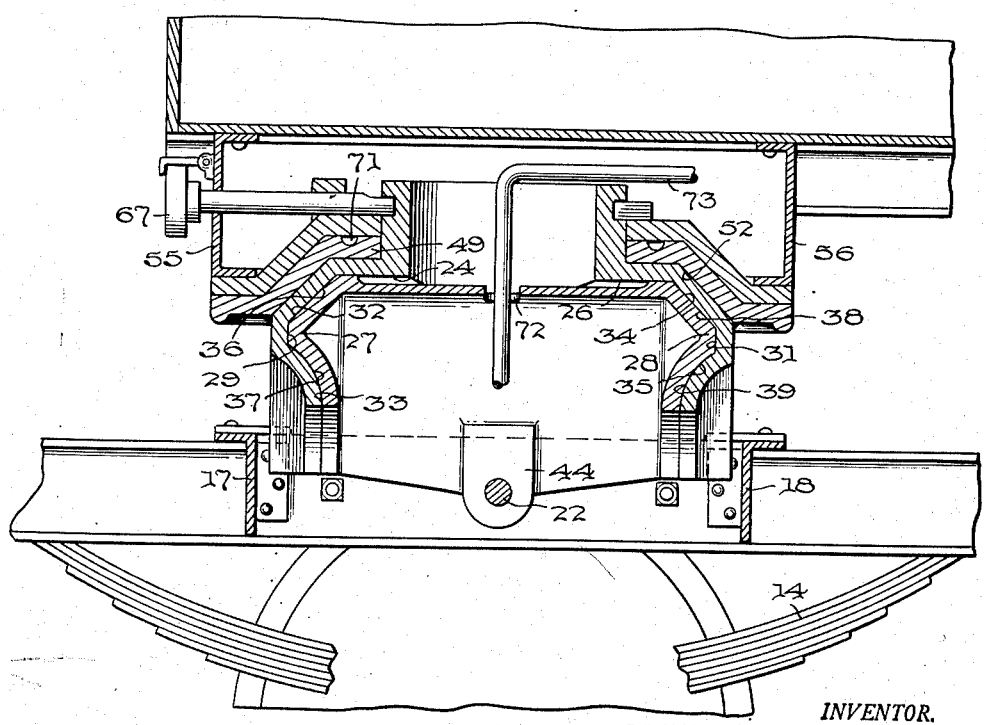
Fig. 2 is a vertical, longitudinal section through the apparatus shown in Fig. 1.

In Fig. 1 a portion of a tractor is illustrated as having longitudinal chassis frame members 11 and 12 carried in a conventional manner by supports 13 and 14. Resting in the frame members 11 and 12 is a rectangular sub-frame having longitudinal members 15 and 16 connected by cross members 17 and 18. Mounted between frame members 11 and 12 and sub-frame members 15 and 16 are a pair of bearing blocks 19 and 21 rotatably supporting a transverse shaft 22. Mounted on the shaft 22 is a rider plate designated generally as 23 having a convex top surface 24 of approximately semi-cylindrical shape. Resting on this convex top surface 24 is a saddle plate 25 having a concave bottom surface 26 complementary with convex top surface 24. The axis of curvature of complementary concave and convex surfaces 24 and 26 extends in a longitudinal direction with respect to the tractor so the saddle plate 25 is slidable on rider plate 23 in a transverse arcuate path about the longitudinal axis of the tractor. Rider plate 23 has its ends formed with arcuate projections 27 and 28, symmetrical with respect to the longitudinal axis of the tractor so they are approximately of semi-circular shape. Saddle plate 25 has its ends formed with arcuate recesses 29 and 31 symmetrical with respect to the longitudinal axis of the tractor and approximately of semi-circular shape. These recesses are complementary with projections 27 and 28 which are fitted into recesses 29 and 31 so the saddle plate 25 is retained on rider plate 23 and can slide relative to the saddle plate solely in an arcuate transverse path about the longitudinal axis of the tractor.

Preferably, projection 27 is formed, in part, by an extension surface 32 merging with one end of convex surface 24 on the rider plate and extending downwardly and outwardly toward the longitudinal axis of the tractor. This extension surface 32 is symmetrical with respect to the longitudinal axis of the tractor. In addition, an end surface 33 extends downwardly and inwardly from extension surface 32 toward the longitudinal axis, in the reverse direction with respect to extension surface 32, completing the projection 27. End surface 33 is also symmetrical with respect to the longitudinal axis of the tractor so it is of arcuate shape. Similarly, projection 28 is formed in part, by extension surface 34 merging with the other end of convex surface 24 extending downwardly and outwardly toward the longitudinal axis of the tractor in a direction opposite to the extension surface 32. End surface 35 similar to end surface 33 extends from extension surface 34 downwardly and inwardly toward the longitudinal axis of the tractor in a reverse direction with respect to its corresponding extension surface 34. Extension surface 34 and end surface 35 are both of arcuate formation symmetrical with respect to the longitudinal axis of the tractor.

Saddle plate 25 has its recesses 29 and 31 formed with similar extension and end surfaces. For example, recess 29 is partially formed by extension surface 36 merging with one end of concave surface 26 on the saddle plate extending downwardly and outwardly toward the longitudinal axis of the tractor and symmetrical with respect to that axis. End surface 37 extends from extension surface 36 downwardly and inwardly toward the longitudinal axis of the tractor in the reverse direction with respect to extension surface 36 and is of arcuate shape symmetrical with respect to the longitudinal axis of the tractor. Similarly, recess 31 is formed in part by extension surface 38, which extends from the other end of concave surface 26 downwardly and outwardly toward the longitudinal axis of the tractor in the opposite direction with respect to extension surface 36, and which is of arcuate shape symmetrical with respect to that axis. Extension surface 38 extends in the opposite direction as compared with extension surface 36. Completing recess 31 is end surface 39, which extends downwardly and inwardly from extension surface 38 toward the longitudinal axis of the tractor in the reverse direction with respect to its corresponding extension surface 36, and which is of arcuate shape and symmetrical with respect to that axis.

From an inspection of the drawings, it will be apparent that extension surfaces 32 and 34 on the rider plate are complementary with extension surfaces 36 and 38 of the saddle plate. Also, end surfaces 33 and 35 on the rider plate are complementary with end surfaces 37 and 39 on the saddle plate. All of these surfaces are of arcuate shape symmetrical with respect to the longitudinal axis of the tractor so the saddle plate may slide on the rider plate only in an arcuate path symmetrical with respect to the same axis. Preferably, end surfaces 33 and 35 are of concave formation in a longitudinal direction complementary with convex end surfaces 37 and 39. These complementary concave and convex surfaces forming the end surfaces provide additional interlocking areas retaining the saddle plate and rider plate in interlocked relation to transmit horizontal thrust in the direction of the longitudinal axis of the tractor and also prevent relative movement of the parts in a vertical direction.

To limit relative sliding movement of the saddle plate 25 on rider plate 23, saddle plate 25 is provided near each side with elongated openings 41 and 42 through which project stops 43 and 44 on the rider plate. Shaft 22 extends through both stops as these enlarged portions of the rider plate add strength to the mounting on the shaft. As illustrated, stop 43 is separable from the rider plate 23 so the plates may be assembled by removing stop 43 and inserting that side of the rider plate into the opposite side of the saddle plate. When thus assembled, the stop 43 may be inserted over shaft 22 and secured to the rider plate 23 as by a bolt 45. Shaft 22 may then be assembled in the sub-frame with bearing blocks 19 and 21 and positioned in the chassis frame of the tractor.

The uppermost part of the saddle plate 25 is formed with a cylindrical or tubular neck 47. A turntable 48 has an annular top 49 surrounding the neck 47 and secured thereto as by welding. Depending from annular top 49 is a frusto-conical bearing surface 51 extending downwardly and outwardly. Preferably, inner surface 52 of the frusto-conical portion is inclined at the same angle as the angle of inclination of extension surfaces 36 and 38 on the saddle plate so, the inner part of the turntable 48 contacts, at fore and aft points, the exposed faces 36' and 38' parallel and corresponding to the extension surfaces of the saddle plate. In the vertical plane through these fore and aft points and through the longitudinal axis of the tractor, annular top 49 on the turntable also engages to top part of the saddle plate 25 corresponding to concave surface 26. Surrounding the bottom of frusto-conical bearing surface 51 is an annular rim 50 extending horizontally outwardly from the bearing surface.

This construction completes that part of the fifth wheel connection which is normally mounted on the tractor and which is illustrated in Figs. 3 and 4.

As illustrated in Fig. 1, a rectangular sub-frame has longitudinal members 53 and 54 and transverse members 55 and 56 suspended from the main frame of the trailer. Mounted on this sub-frame is a trailer plate 57 having an annular top 58 provided with an opening to surround neck 47. Extending downwardly and outwardly from the top 58 is a frusto-conical bearing surface 59 complementary with and arranged to rest upon the frusto-conical bearing surface 51 of the turntable 48 when top 58 is resting on top 49. Surrounding the lower end of frusto-conical bearing surface 59 is an annular rim 61 extending outwardly from the bearing surface and arranged to rest upon the annular rim 50 on the turntable 48.

To lock the trailer plate 57 on the turntable 48, annular top 58 has pivoted thereon by bolts 63 and 64 split ring portions 65 and 66 which may be operated by a handle 67 to engage annular groove 68 formed in the upper end of neck 47 in a manner described in the aforementioned Bradshaw Patent No. 2,129,989.

For lubrication between the turntable and the trailer plate, turntable 48 may have its top 49 formed with a circular oil groove 71. Convex surface 24 on the rider plate 23 is provided with an elongated transverse opening 72 so an air line 73 may pass downwardly through the neck 47 and opening 72 for connection with the tractor.

As already explained, the complementary projections and recesses on the end pieces of the rider and saddle plates, which projections and recesses are symmetrical with respect to a longitudinal axis, interlock the plates permitting movement only in the arcuate path transversely of the tractor. This arrangement of the parts prevents the accumulation of dirt between the complementary concave and convex surfaces on the plates and provides a secure interlock between the plates without adding to the cost of manufacture. The provision of complementary frusto-conical bearing surfaces in the turntable and the tractor plate provides for the transmission of horizontal thrust in all directions and increases the bearing surfaces without increasing the size of the turntable and the trailer plate. Particularly, in a fore and aft direction longitudinally of the tractor, horizontal thrusts are transmitted from the trailer plate to the turntable and directly to the saddle plate without strain on the neck 47. The particular shape of the turntable and the trailer plate increases the strength of the fifth wheel connection without adding to the cost or the size thereof.

What is claimed is:

1. In a fifth wheel connection having a rider plate and a saddle plate with complementary concave and convex surfaces permitting relative sliding movement in an arcuate path about a longitudinal axis, the combination of complementary projection and recesses at the ends of said plates symmetrical with respect to said longitudinal axis interlocking said plates and permitting relative sliding movement thereof solely in said arcuate path.

2. In a fifth wheel connection having a rider plate and a saddle plate with complementary concave and convex surfaces permitting relative sliding movement of said plates in an arcuate path about a longitudinal axis, the combination of end pieces on said plates having contiguous surfaces formed with complementary interlocking projections and recesses symmetrical with respect to said axis and permitting relative sliding movement of said plates solely in said arcuate path.

3. In a fifth wheel connection, the construction defined in claim 2 wherein said interlocking projections and recesses include complementary concave and convex surfaces.

4. In a fifth wheel connection having a rider plate and a saddle plate with complementary concave and convex surfaces permitting relative sliding movement of said plates in an arcuate path about a longitudinal axis, the combination of end pieces on said rider plate having projections formed thereon symmetrical with respect to said axis, and end pieces on said saddle plate formed with recesses symmetrical with respect to said axis, said recesses being complementary and interlocking with said projections to permit relative sliding movement of said plates solely in said arcuate path.

5. In a fifth wheel connection, the construction defined in claim 4 wherein said projections include concave surfaces and said recesses include convex surfaces complementary with said concave surfaces.

6. A fifth wheel connection comprising a rider plate for attachment to a tractor, a convex top surface on said rider plate symmetrical with respect to a longitudinal axis, arcuate extension surfaces on said rider plate merging with each end of said convex top surface symmetrical with and sloping in opposite directions toward said axis, arcuate end surfaces on said rider plate merging with the respective extension surfaces symmetrical with and sloping toward said axis in reverse directions with respect to the corresponding extension surfaces, a saddle plate having a concave bottom surface complementary with and resting upon said convex surface, arcuate extension surfaces on said saddle plate merging with each end of said concave surface symmetrical with and sloping in opposite directions toward said axis, an arcuate end surface merging with the respective extension surfaces on said saddle plate symmetrical with and sloping toward said axis in reverse directions with respect to the corresponding extension surfaces on said saddle plate, said extension and end surfaces on said saddle plate being complementary and interlocked with said extension and end surfaces on said rider plate permitting relative sliding movement of said plates solely about said axis.

7. A fifth wheel connection as defined in claim 6 wherein one of said plates is formed with openings in the surface thereof, and stops on the other plate extending through said openings limiting relative movement of said plates in said arcuate path.

8. A fifth wheel connection as defined in claim 6 having a turntable plate mounted on said saddle plate to support a corresponding trailer plate.

9. In a fifth wheel connection comprising a rider plate for attachment to a trailer, a convex top surface on said rider plate symmetrical with respect to a longitudinal axis, arcuate extension surfaces on said rider plate merging with each end of said convex top surface symmetrical with and sloping outwardly in opposite directions toward said axis, arcuate end surfaces on said rider plate merging with the respective extension surfaces symmetrical with and sloping inwardly toward said axis, a saddle plate having a concave bottom surface complementary with and resting upon said convex surface, arcuate extension surfaces on said saddle plate merging with each end of said concave surface symmetrical with and sloping outwardly in opposite directions toward said axis, arcuate end surfaces merging with the respective extension surfaces on said saddle plate symmetrical with and sloping inwardly toward said axis, said extension and end surfaces on said saddle plate being complementary and interlocked with said extension and end surfaces on said rider plate permitting relative sliding movement of said plates solely about said axis, upper exposed surfaces on said saddle plate parallel to said extension surfaces on said saddle plate, and a turntable having a frusto-conical inner surface engaging said exposed surfaces in the vertical plane of said axis.

10. The fifth wheel connection defined in claim 6 wherein the end surfaces on one of said plates have concave surfaces and the end surfaces on the other plate have complementary convex surfaces.

11. In a fifth wheel connection having a rider plate attachable to a trailer, a saddle plate slidable in an arcuate transverse path on said rider plate, and a cylindrical neck extending upwardly from said saddle plate, a turntable on said saddle plate comprising an annular top surrounding said neck, and a frusto-conical bearing surface merging with said top and sloping downwardly and outwardly therefrom.

12. In a fifth wheel connection having a rider plate attachable to a trailer, a saddle plate slidable in an arcuate transverse path on said rider plate, a cylindrical neck extending upwardly from said saddle plate, a turntable on said saddle plate comprising an annular top surrounding said neck, a frusto-conical bearing surface merging with said top and sloping downwardly and outwardly therefrom, and an annular rim surrounding the bottom of said bearing surface.

13. In a fifth wheel connection having a rider plate attachable to a tractor, a saddle plate slidable in an arcuate transverse path on said rider plate, a cylindrical neck extending upwardly from said saddle plate, a turntable on said saddle plate comprising an annular top surrounding said neck, a frusto-conical bearing surface merging with said top and sloping downwardly and outwardly therefrom, an annular rim surrounding the bottom of said bearing surface, a trailer plate having an annular top surrounding said neck and resting on the top of said turntable, a frusto-conical bottom surface resting on said bearing surface, and an annular rim at the bottom of said frusto-conical bottom surface resting upon the annular rim on said turntable, said annular rim on the trailer plate being attachable to the body of a trailer.

CHARLES MARTIN.

References Cited in the file of this patent

UNITED STATES PATENTS

| Number | Name | Date |
|---|---|---|
| 1,606,242 | Knox | Nov. 9, 1926 |
| 1,964,778 | Yost | July 3, 1934 |
| 2,053,812 | Bradshaw | Sept. 8, 1936 |
| 2,129,989 | Bradshaw | Sept. 13, 1938 |